(12) United States Patent
Boecker

(10) Patent No.: US 12,195,271 B2
(45) Date of Patent: Jan. 14, 2025

(54) PACKAGING FOR A RECORD, IN PARTICULAR FOR SHIPPING

(71) Applicant: canvas&frame GmbH, Berlin (DE)

(72) Inventor: Matthias Boecker, Berlin (DE)

(73) Assignee: canvas&frame GmbH, Berlin (DE)

( * ) Notice: Subject to any disclaimer, the term of this patent is extended or adjusted under 35 U.S.C. 154(b) by 0 days.

(21) Appl. No.: 18/129,810

(22) Filed: Mar. 31, 2023

(65) Prior Publication Data

US 2023/0312226 A1 Oct. 5, 2023

(51) Int. Cl.
*B65D 85/00* (2006.01)
*B65D 81/03* (2006.01)

(52) U.S. Cl.
CPC ........... *B65D 85/548* (2013.01); *B65D 81/03* (2013.01)

(58) Field of Classification Search
CPC ..... B65D 85/544; B65D 85/548; B65D 81/03
USPC ......... 206/307, 308, 308.1, 308.3, 309, 312, 206/313, 425; 150/165; 281/20, 29
See application file for complete search history.

(56) References Cited

U.S. PATENT DOCUMENTS

| | | | | |
|---|---|---|---|---|
| 3,227,354 A | | 1/1966 | Gunyou | |
| 5,775,490 A | * | 7/1998 | Baker | B65D 85/546 |
| 5,823,333 A | * | 10/1998 | Mori | G11B 33/0494 |
| | | | | 206/312 |
| 7,578,389 B1 | * | 8/2009 | Haas | G11B 33/0422 |
| | | | | 229/92.8 |
| 7,857,196 B1 | * | 12/2010 | Gorman | B65D 27/34 |
| | | | | 229/72 |
| 2002/0125153 A1 | * | 9/2002 | Cinquina | G11B 33/0422 |
| | | | | 206/308.1 |
| 2005/0252800 A1 | * | 11/2005 | Smyth | G11B 33/0422 |
| 2009/0242437 A1 | * | 10/2009 | Daum | G11B 33/045 |
| | | | | 493/243 |
| 2011/0180434 A1 | * | 7/2011 | Corey | B42D 25/285 |
| | | | | 206/307 |
| 2011/0203951 A1 | * | 8/2011 | Carrasquillo | G11B 33/0427 |
| | | | | 493/243 |
| 2013/0118931 A1 | * | 5/2013 | Rodriguez | G11B 33/0494 |
| | | | | 206/308.1 |

FOREIGN PATENT DOCUMENTS

| | | |
|---|---|---|
| DE | 8813972 U1 | 3/1989 |
| FR | 2307707 A2 | 12/1976 |
| GB | 2435026 A | 8/2007 |
| GB | 2474070 A | 4/2011 |
| GB | 2474070 * | 6/2011 |

(Continued)

*Primary Examiner* — Rafael A Ortiz
(74) *Attorney, Agent, or Firm* — Patent Technologies, LLC; Robert D. Gunderman, Jr.

(57) ABSTRACT

The present invention relates to folding packaging for transporting vinyl records having an inner packaging element and an outer packaging element. The inner packaging element includes a rectangular first base plate, a first tab, a second tab, a third tab and a fourth tab. The outer packaging element includes a rectangular second base plate, a fifth tab, and a sixth tab; the first base plate and the second base plate lie flat on one another and are connected together, the tabs form folds with the associated base plates and can be folded onto the base plates to enclose the vinyl record(s), and the outer packaging element in the closed state is provided to surround the closed inner packaging element.

13 Claims, 2 Drawing Sheets

(56) References Cited

FOREIGN PATENT DOCUMENTS

| JP | H4 21420 U | 2/1992 |
| WO | WO 2011 117208 A1 | 9/2011 |
| WO | WO 2019 025816 A1 | 2/2019 |

\* cited by examiner

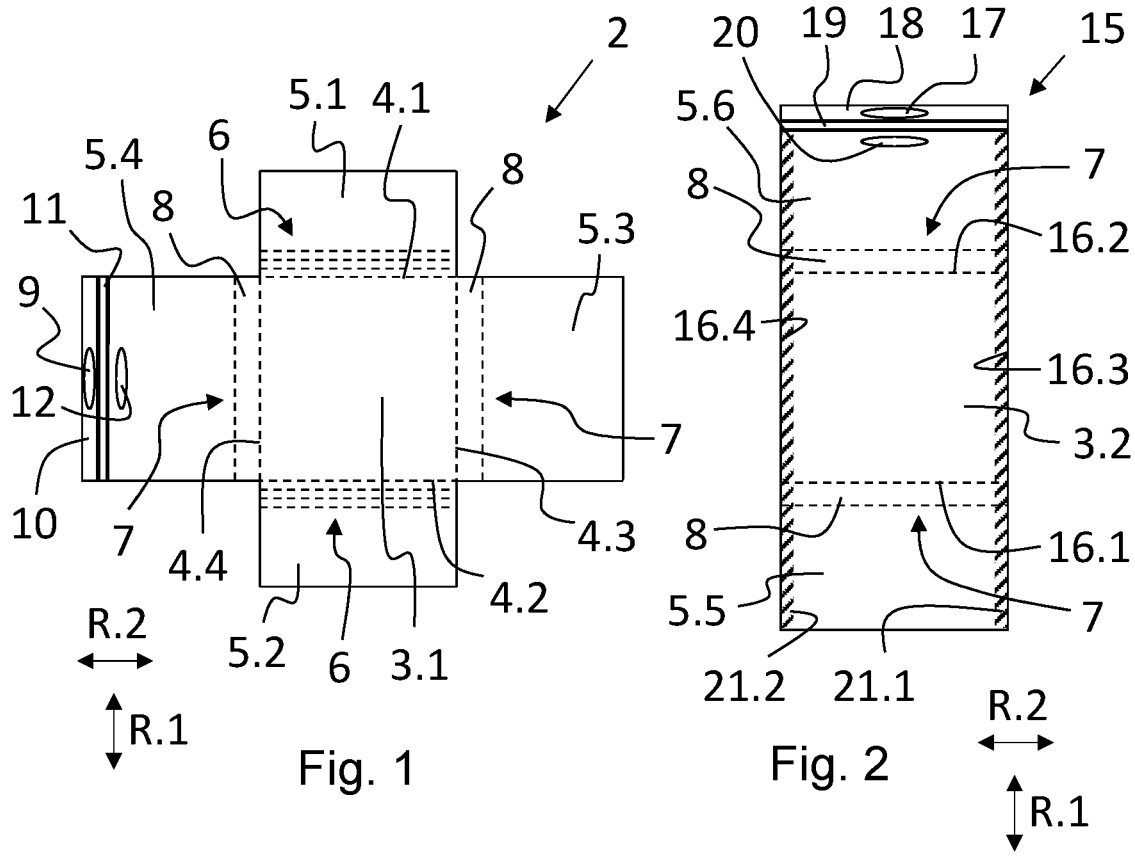
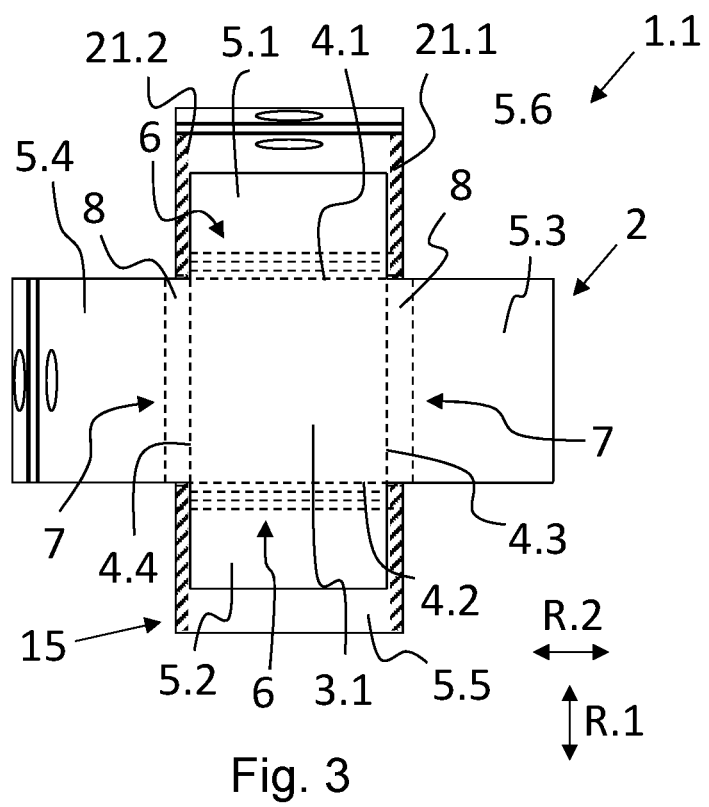

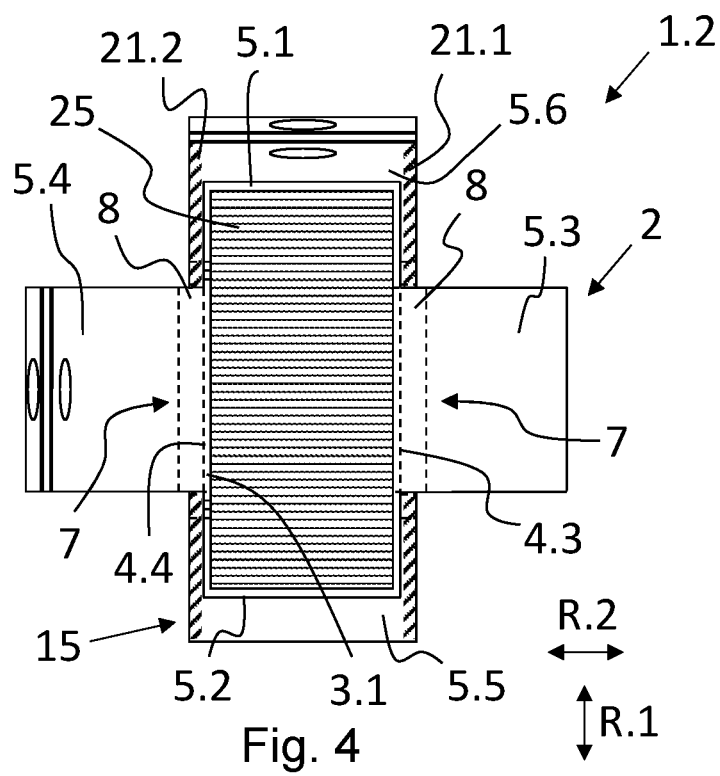
Fig. 4
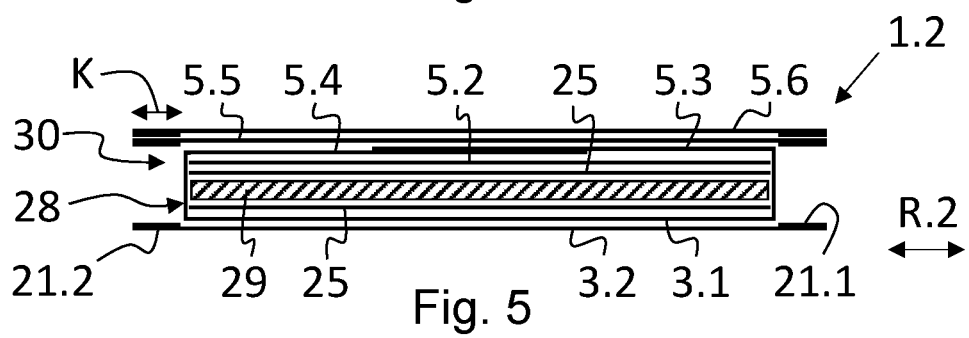
Fig. 5
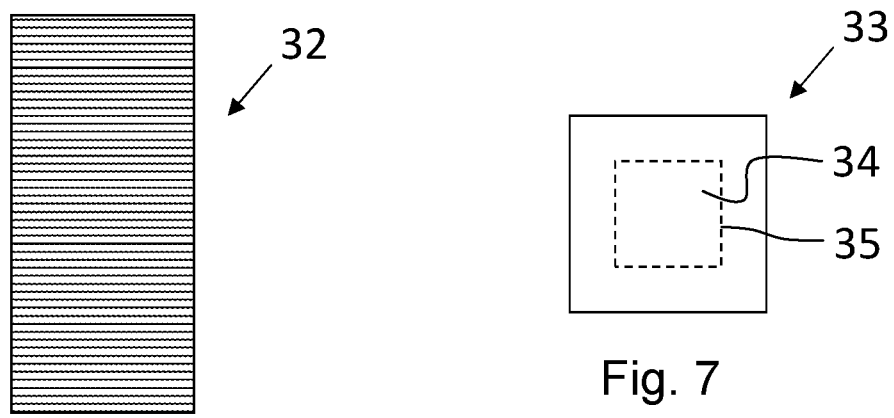
Fig. 6
Fig. 7

PACKAGING FOR A RECORD, IN PARTICULAR FOR SHIPPING

CROSS REFERENCE TO RELATED PATENT APPLICATIONS

This application claims priority to European Patent Application EP22166540.9 filed on Apr. 4, 2022 entitled "Verpackung für eine Schallplatte, insbesondere zum Versand" by Matthias Boecker, the entire disclosure of which is incorporated herein by reference in its entirety.

FIELD OF THE INVENTION

The present invention concerns folding packaging for transporting vinyl records, such as for shipment of vinyl records by means of a courier service. The present invention furthermore comprises two folding packaging systems, each having such folding packaging.

BACKGROUND OF THE INVENTION

Folding packaging for shipment of products is a known endeavour. For example, for shipment of books, CDs and other goods which are sufficiently rigid in themselves, normally cardboard packaging is used which surrounds the product by means of multiple flat packaging parts which can be folded onto one another, wherein in the interior, tabs or cutouts are provided by means of which the product is fixed in a position. Such packaging is not however suitable for vinyl records such as audio records which comprise a non-rigid cover, for example made of thin cardboard, and a vinyl record inserted therein, since in particular the cover can buckle at corners protruding beyond the vinyl record.

Therefore there exists special packaging for vinyl records which mostly achieves a fixing of the vinyl record and at the same time protection for the cover. This packaging however often does not provide satisfactory protection against generally rough handling by a courier service.

In order to offer sufficient protection for a vinyl record against damage when using such or other packaging not specifically designed for vinyl records, disadvantageously, it is necessary during packaging to insert additional protective material for stiffening, fixing and/or padding, which is associated with undesirable cost.

SUMMARY OF THE INVENTION

Given the deficiencies in current vinyl record packaging, in particular in view of the rapidly growing popularity of vinyl records and the general trend towards the mail order trade, it is an object of the present invention to provide a packaging for vinyl records which offers adequate protection for transport, in particular shipment, of a vinyl record or multiple vinyl records, and which is easy to handle.

An object of the invention is achieved by the features of the independent main claims. Advantageous refinements are indicated in the dependent claims. Where technically possible, the teaching of the subclaims may be combined arbitrarily with the teaching of the main and subclaims.

According to a first aspect of the invention, the object is achieved by a folding packaging for transporting vinyl records, comprising an inner packaging element and an outer packaging element, wherein the inner packaging element comprises:
a rectangular first base plate,
a first tab connected to a first edge of the first base plate,
a second tab connected to a second edge of the first base plate opposite the first edge of the first base plate,
a third tab connected to a third edge of the first base plate, and
a fourth tab connected to a fourth edge of the first base plate opposite the third edge of the first base plate;
wherein the outer packaging element comprises:
a rectangular second base plate,
a fifth tab connected to a first edge of the second base plate, and
a sixth tab connected to a second edge of the second base plate opposite the first edge of the second base plate;
wherein the first base plate and the second base plate lie flat on one another and are connected together, wherein the tabs form folds with the associated base plates and can be folded onto the base plates to enclose the vinyl record(s), and wherein the outer packaging element in the closed state is provided to surround the closed inner packaging element.

Advantages of the claimed inventive aspects are explained below, and preferred modified embodiments of the inventive aspects are also described below. Explanations, in particular of the advantages and definitions of features, are in principle descriptive and preferred but not limitative examples. Where explanation is limitative, this is expressly stated.

Insofar as elements are designated with numbering, e.g. first component, second component and third component, this numbering is intended purely to differentiate the designations and does not indicate a mutual dependency of the elements or a compulsory order of the elements. In particular, this means that a device need not have a "first component" in order to have a "second component". The device may also have a "first component" and a "third component" but not necessarily a "second component". Multiple units of an element are also provided with a single number. e.g. multiple "first components".

A vinyl record in one instance means a multipiece product comprising a round vinyl record written with data and a rectangular, in particular square cover provided for enveloping the vinyl record. Often, particular value, in particular a specific collecting value, is placed on the cover since this is usually complex in design and hence artistically accompanies the data stored on the vinyl record, in particular the music stored thereon. The cover may also be printed with information such as a list of the contents of the data stored on the vinyl record.

The cover is usually made of paper or thin cardboard and has only a low inherent stability. In particular, the cover is susceptible to buckling, such as at corners protruding beyond the vinyl record. The vinyl record itself has a certain stability and flexibility, but is not adequately protected from damage during shipment by its composition. As well as the risk of breakage, there is also the danger of scratching, in particular of the data-carrying surface of the vinyl record. The term "vinyl record" here also includes records made of known alternative materials, such as shellac records, wherein vinyl (polyvinylchloride or PVC) is today used almost exclusively for the production of vinyl records. Vinyl records furthermore usually comprise plastic or paper sleeves, known as inner sleeves, which are additionally laid around the vinyl record in order to protect the vinyl record from scratching from the inside of the cover.

Both base plates and tabs are formed as flat elements, i.e. have significantly greater extents in two spatial dimensions than in a third spatial dimension, and to this extent form two surfaces and edges extending between the surfaces. Insofar as the first and second base plates lie flat on one another, the respective surfaces of the base plates face one another and touch. A connection is formed at a resulting contact surface, for example by adhesion. Insofar as a tab is connected to an edge, the tab is in particular moulded integrally onto the edge. A fold is then formed, for example by pressing in or perforating the material along the edge.

The folding packaging or a respective packaging element is intended to form an enclosed space in which the product is received for transport. In the case of the inner packaging element, the product is one or more vinyl records; in the case of the outer packaging element, the product is the inner packaging element with vinyl record or records arranged therein. The tabs are folded out in an open state of the respective packaging element, so they do not lie over the respective base plate but extend laterally away from the respective base plate, wherein then the space to be enclosed is open for insertion or removal of the product. As soon as a product is placed on a base plate, the tabs are folded onto the base plates or product, in particular in a predefined sequence, and thus enclose the product in the enclosed space.

The folds are then arranged at the side of the product and encase this. The tabs with the assigned base plates then form a closed state of the respective packaging element, wherein this closed state is particularly preferably sustained by fastening means for shipment.

In the sense of the present invention, "padding" means that the product is surrounded by a material which absorbs deformation energy under impact or other pressure loading, and thus protects the product from the effect of force. "Fixing" means a holding of the product, which prevents the product from being able to slip around inside the folding packaging under external acceleration. "Stiffening" means that the packaging absorbs a bending load, in order to prevent bending or buckling of the product.

The first aspect of the invention now comprises the teaching that the folding packaging is formed from an inner packaging element and an outer packaging element. The inner packaging element is provided for fixing the vinyl record(s) such that neither the cover nor the vinyl record can slip beyond a tolerable extent. The four tabs of the inner packaging element encase the vinyl record(s) on all sides and thus ensure such fixing. Particularly preferably, the surface of the first base plate has the dimensions of a conventional vinyl record, or exceeds these dimensions precisely such that in the closed state of the inner packaging element, the folds of the tabs lie against edges of the vinyl record(s), or the vinyl record(s) only have a slight play relative to the folds. A standard site for a vinyl record is approximately 31.5 cm for a 12-inch vinyl record, or around 18.5 cm for a 7-inch vinyl record. The inner packaging element already provides a padding and stiffening of the vinyl record(s).

The first aspect of the invention furthermore comprises the teaching that by means of the outer packaging element surrounding the inner packaging element, an additional protection is provided, in particular an additional padding and additional stiffening of the vinyl record(s), which in combination with the inner packaging element finally ensures adequate protection of the vinyl record(s). By connecting the first and second base plates, a folding packaging is created which is simple to handle and is advantageously formed from a single component. The fifth and sixth tabs are then simply folded when the inner packaging element is closed. By providing larger dimensions of the space enclosed by the outer packaging element compared with the outer dimensions of the closed inner packaging element, in particular one or more crumple zones which provide additional protection for the inner packaging element, in particular against falling of the folding packaging, are created. To create said protective function of the outer packaging element, it is sufficient simply to form this with two tabs.

In a particularly preferred embodiment, a fixing means for fixing a vinyl record or multiple vinyl records is attached, in particular glued, in the inner packaging element, wherein the fixing means extends over the first base plate, the first tab and the second tab and is provided to grip around the vinyl record or records. For example, the fixing means is configured as a structured cardboard, in particular corrugated cardboard, or as bubble wrap. Such a fixing means provides a particularly secure fixing of the vinyl record in the interior of the packaging element, since the edges of the vinyl record engage in or are slightly pressed into the surface of the fixing means and are thus held. Because of the fastening of the fixing means, this need not be placed in the folding packaging first when packing one or more vinyl records, so the folding packaging is particularly simple to handle. Preferably, the thickness of the fixing means is taken into account in the dimensioning of the base plate, so that the vinyl record is fixed into the fixing means without being damaged. The fixing means furthermore achieves a desired effect even if it extends only over two mutually opposite tabs of the inner packaging element and the base plate. Extending over all four tabs of the inner packaging element is not necessary but is also possible as an embodiment of the first inventive aspect. Preferably, the fixing means is attached to the first base plate. The first base plate is particularly suitable for this purpose since it does not move on closure of the inner packaging element and to this extent offers a stationary fastening point for the fixing means. The fixing means preferably lies merely loosely on the first tab and the second tab, so that on closure of the inner packaging element, it can move relative to the tabs and thus there is no bracing of the tabs and fixing means against one another.

In one embodiment, at least two mutually opposite tabs, in particular at least the fifth tab and the sixth tab, form double folds with the associated base plates, wherein a side face of the assigned packaging element is formed between two parallel fold edges of the double fold. The closed outer packaging element then has a height which corresponds to the height of the side faces, so that a sufficiently high enclosed space is created for receiving the inner packaging element. In particular, an outer packaging element composed in this way has a degree of tolerance for different heights of the closed inner packaging element, e.g. if different numbers of vinyl records are to be packed. The second base plate and the fifth tab, and the second base plate and the sixth tab, are then, depending on number of vinyl records, not arranged fully parallel with one another in the closed state of the outer packaging element.

Particularly preferably, the inner packaging element and/or the outer packaging element are made of cardboard. Cardboard is advantageously lightweight and offers adequate protective properties, in particular adequate padding and stiffening. Cardboard is also recyclable in an environmentally friendly fashion.

Further preferably, the first base plate is glued to the second base plate. In this way, a particularly simple and favourable but also stable connection of the inner packaging element to the outer packaging element is obtained.

In one embodiment, the first tab and the second tab are configured as inner tabs relative to the third tab and the fourth tab. The first tab and the second tab are thus designed to be folded onto the base plate first on closure of the inner packaging element, wherein then the third tab and fourth tab are folded over the first tab and second tab. The third tab and the fourth tab in particular have a double fold as previously described with respect to the outer packaging element, so that a resulting side face is sufficient to protrude beyond the first tab and second tab in the height direction. In particular, the first tab and the second tab, and/or the third tab and the fourth tab, may also overlap one another in the closed state.

In a further embodiment, the first tab and the second tab lie opposite one another in a first direction, wherein the fifth tab and the sixth tab also lie opposite one another in the first direction. In particular if the third tab and the fourth tab lie over the first tab and the second tab in the closed state of the inner packaging element, an alternating fold direction of the tabs is achieved on closure of the folding packaging, which makes the folding packaging particularly stable and secure.

Particularly preferably, the second base plate protrudes beyond the first base plate on both sides in the first direction and/or in a second direction running perpendicular to the first direction. In this way, in the closed state of the outer packaging element, the protrusions create crumple zones so that the vinyl record(s) is/are particularly well protected against impact or other pressure loads.

Particularly preferably, the second base plate, the fifth tab and/or the sixth tab each have stiffenings at their mutually opposite edges in the second direction, so that protrusions of the outer packaging element beyond the inner packaging element in the second direction create particularly stable crumple zones, in order to absorb a particularly large amount of deformation energy under an impact or pressure load. Such a stiffening may be achieved for example by an over-folded edge.

In one embodiment, at least the first tab and the second tab each have a multiple fold with multiple mutually parallel fold edges for optional forming of side faces of different heights of the inner packaging element. The third tab and the fourth tab, and the fifth tab and the sixth tab, may also have multiple such fold edges or a double fold, so as to produce a side face with dimensions suitable for multiple heights. Advantageously, in this way, the folding packaging may be configured similarly for transporting a single vinyl record or multiple vinyl records, wherein the described advantages are achieved irrespective of the number of vinyl records.

Further preferably, the second tab, the fourth tab and/or the sixth tab each have a fastening means for closing the inner packaging element or the outer packaging element, wherein the fastening means is formed to be separable, in particular by means of a respective tear strip, from the second tab, the fourth tab or the sixth tab. To close the folding packaging, no additional fastening material such as parcel tape or adhesive tape is then required, so the packaging is particularly simple to handle. The tear strip makes the folding packaging particularly simple to open, and it remains in a state in which it can be closed again for further transport, for example by means of further fastening means provided on the tabs or by means of additional fastening material to be used, such as parcel tape or adhesive tape.

A second aspect of the invention concerns a folding packaging system with an above-described folding packaging and at least one fixing means which can be laid in the inner packaging element for fixing a vinyl record or multiple vinyl records, wherein the fixing means is provided to extend over the first base plate, the first tab and the second tab and surround the vinyl record or records. The fixing means here has the same advantages which have already been described with respect to a fixing means attached in the inner packaging element. Because the fixing means is here not attached to the inner packaging element, the advantage is achieved that on packing the vinyl records, it can optionally be decided whether the fixing means is required or not. The fixing means may furthermore comprise a fastening means such as an adhesive point or adhesive strip, by means of which it can be attached to the first base plate.

A third aspect of the invention concerns a folding packaging system with an above-described folding packaging and at least one insert base for supporting or covering one or more vinyl records laid in the inner packaging element. Such an insert base is formed for example by cardboard, which is as rigid as possible, has the dimensions of a vinyl record or is slightly larger than a vinyl record, and is placed below or above the vinyl record or records before or after insertion of the vinyl records in the open inner packaging element. The insert base or multiple insert bases advantageously ensure further stiffening of the folding packaging, which additionally protects the folding packaging or vinyl record(s) against buckling or bending.

BRIEF DESCRIPTION OF THE DRAWINGS

The invention is described in more detail below with reference to the appended drawings showing preferred exemplary embodiments. The word "figure" has been abbreviated in the drawings to "FIG.".

In the drawings:

FIG. 1 shows a view of an opened inner packaging element of a folding packaging according to an embodiment of the first aspect of the invention;

FIG. 2 shows a view of an opened outer packaging element of a folding packaging according to the embodiment shown in FIG. 1 of the first aspect of the invention;

FIG. 3 shows a view of a folding packaging in open state according to the embodiment shown in FIG. 1 and FIG. 2 of the first aspect of the invention, comprising an inner packaging element and an outer packaging element;

FIG. 4 shows a view of a folding packaging in open state according to a further embodiment of the first aspect of the invention, comprising an inner packaging element and an outer packaging element;

FIG. 5 shows a cross-sectional view through a folding packaging from FIG. 4;

FIG. 6 shows a view of a fixing means for a folding packaging according to the first aspect or second aspect of the invention; and FIG. 7 shows a view of an insert base for a folding packaging according to the third aspect of the invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the attached drawings and claims.

DESCRIPTION OF THE PREFERRED EMBODIMENTS

For a general understanding of the present invention, reference is made to the drawings. The present invention will be described by way of example, and not limitation. Modifications, improvements and additions to the invention described herein may be determined after reading this specification and viewing the accompanying drawings; such modifications, improvements, and additions being considered included in the spirit and broad scope of the present invention and its various embodiments described or envisioned herein.

The described exemplary embodiments are merely examples which may be modified and/or supplemented in many ways within the scope of the claims. Every feature which is described for a specific exemplary embodiment may be used independently or in combination with other features in any other exemplary embodiment. Every feature which is described for an exemplary embodiment of a specific claim category may also be used accordingly in an exemplary embodiment of another claim category.

FIG. 1 shows an inner packaging element 2 for a folding packaging according to the first aspect of the invention. The inner packaging element 2 comprises a rectangular first base plate 3.1 with a first edge 4.1, a second edge 4.2 opposite the first edge 4.1 in a first direction R.1, a third edge 4.3, and a fourth edge 4.4 opposite the third edge 4.3 in a second direction R.2. The surface of the first base plate 3.1 can support a vinyl record of conventional size such that the edges 4.1, 4.2, 4.3, 4.4 protrude only insignificantly beyond the edges of the vinyl record.

A first tab 5.1 is formed on the first edge 4.1, wherein the first edge 4.1 forms a multiple fold 6 with the first tab 5.1. A respective fold is here, and also at the other edges 4.1, 4.2, 4.3, 4.4, shown as a dotted line. The multiple fold 6 is configured such that the first tab 5.1 can be folded onto the first base plate 3.1 to form side faces of different heights in order to neatly surround different numbers of vinyl records. In the same way, a second tab 5.2 is formed on the second edge 4.2 by means of a multiple fold 6. A third tab 5.3 is also formed on the third edge 4.3, wherein the third edge 4.3 and the third tab 5.3 together form a double fold 7, so that when the third tab 5.3 is folded over onto the first base plate 3.1, a side face 8 of predefined height is created. In the same way, a fourth tab 5.4 is formed on the fourth edge 4.4 by means of a double fold 7.

The inner packaging element 2 is here shown in an open state. To close the inner packaging element 2 after insertion of one more vinyl records, firstly the first tab 5.1 and the second tab 5.2 are folded successively onto the vinyl record(s) or onto the first base plate 3.1 lying below the vinyl record or records, wherein for folding, one fold or two folds of the multiple fold 7 are selected, so as to ensure a neat enclosure of the vinyl record(s) and hence a fixing of the vinyl record(s). Then the third tab 5.3 and the fourth tab 5.4 are folded onto the first tab 5.1 and the second tab 5.2, or the vinyl record(s) lying underneath, or the first base plate 3.1 lying underneath. First the third tab 5.3 is folded and then the fourth tab 5.4, so that the fourth tab 5.4 lies on the third tab 5.3. By means of a fastening means 9, here formed as adhesive strip, the fourth tab 5.4 is then fastened to the third tab 5.3 in order to close the inner packaging element 2. The fastening means 9 is arranged on an outer portion 10 of the fourth tab 5.4 which can be separated from the fourth tab 5.4 and the portion 10 via a tear strip 11 perforated on both sides. When the fourth tab 5.4 is attached to the third tab 5.3, the inner packaging element 2 can be opened by removing the tear strip 11. On the tab 5.4, on a side of the tear strip 11 facing the first base plate 3.1, a further fastening means 12 is provided which is also configured as an adhesive strip and by means of which an inner packaging element 2, opened as described above, can be closed again.

FIG. 2 shows an outer packaging element 15 for a folding packaging according to the first aspect of the invention. The outer packaging element 15 has a rectangular second base plate 3.2 which is dimensioned such that the first base plate 3.1 can be arranged thereon without protruding beyond this. The second base plate 3.2 has a first edge 16.1 and a second edge 16.2 lying opposite the first edge 16.1 in the first direction R.1. The second base plate 3.2 furthermore has a third edge 16.3 and a fourth edge 16.4 lying opposite the third edge 16.3 in the second direction R.2. A fifth tab 5.5 is formed on the first edge 16.1 of the second base plate 3.3 via a double fold 7, and a sixth tab 5.6 is also formed on the second edge 16.2 of the second base plate 3.2 via a double fold 7.

FIG. 2 shows the outer packaging element 15 in an open state. To close the outer packaging element, first the fifth tab 5.5 is folded onto an inner packaging element 2 lying on the second base surface 3.2, wherein again a side face 8 is formed. Then the sixth tab 5.6 is folded onto the fifth tab 5.5 and attached to the fifth tab 5.5 by means of a fastening means 17 configured as an adhesive strip, in order to close the outer packaging element 15. The fastening means 17 is in turn attached to a portion 18 which is connected to the sixth tab 5.6 via a tear strip 19 perforated on both sides, so that a closed outer packaging element 15 can be opened by removing the tear strip 19. To close the outer packaging element 15 again, a further fastening means 20 configured as an adhesive strip is again provided on the sixth tab 5.6.

The second base plate 3.2 is provided to receive the inner packaging element 2. Here, stiffenings 21.1, 21.2 are formed on opposite edges of the second base plate 3.2 in the second direction R.2, and on the fifth tab 5.5 and the sixth tab 5.6, forming a protrusion above a first base plate 3.1 laid on the second base plate 3.2. The stiffenings 21.1, 21.2 are for example formed as double layers, as an over-folded edge, of the material of the outer packaging element 15. In closed state of the outer packaging element 15, the stiffenings 21.1, 21.2 form a crumple zone for the inner packaging element 2, as will be explained in more detail below with reference to FIG. 5.

FIG. 3 shows a folding packaging 1.1 with the packaging elements 2, 15 shown in FIGS. 1 and 2 in open state. The first base plate 3.1 is connected, in particular glued, to the second base plate 3.2. To close the folding packaging 1.1 after a vinyl record or several vinyl records have been laid neatly on the first base surface 3.1, firstly the inner packaging element 2 is closed. For this, the tabs 5.1, 5.2, 5.3, 5.4 are folded over the vinyl record(s) in the order of the numbering given here, and closed by the fastening means 9. Thus the vinyl record(s) is/are fixed by being surrounded by the tabs 5.1, 5.2, 5.3, 5.4. Then the outer packaging element 15 is closed in that the tabs 5.5, 5.6 are folded over the packaging element 2 in the order of the numbering used here, and closed by means of the fastening means 17. The outer packaging element 15 provides additional protection for the vinyl records against damage, in particular during shipment.

FIG. 4 shows a folding packaging 1.2 which substantially corresponds to the folding packaging 1.1 shown in FIG. 3. A repeated description of features already described is omitted. The folding packaging 1.2 also has a fixing means 25 formed as corrugated cardboard, which extends over the first base plate 3.1, the first tab 5.1 and the second tab 5.2.

The fixing means 25 is here connected, for example glued, to the first base plate 3.1 but not to the first tab 5.1 or second tab 5.2. The corrugations of the fixing means 25 follow one another in the first direction R.1, so that one or more vinyl records laid in the fixing means 25 can be gripped at their edges between two corrugations on folding of the fixing means 25, and thus additionally fixed. Alternatively for example, a fixing means 25 may also be formed from differently structured cardboard or as bubble wrap, wherein an additional fixing of the vinyl record(s) is achieved in similar fashion.

FIG. 5 shows a schematic cross-section through a closed folding packaging 1.2 according to FIG. 4. The inner packaging element 2 here forms an enclosed space 28 in which one more vinyl records 29 are laid. The underside of the vinyl record(s) 29 lies on the fixing means 25 and the first base plate 3.1, and the top side is covered by an upper tab of the fixing means 25, the first tab 5.1, the third tab 5.3 and the fourth tab 5.4. The cross-section is shown in a region in which the first tab 5.1 and the second tab 5.2, and two upper tabs of the fixing means 25, do not overlap, which may however be the case in portions. The closed inner packaging element 2 now described, with the inserted vinyl records 29, itself lies in a space 30 enclosed by the outer packaging element 15. An underside of the inner packaging element 2 lies on the second base plate 3.2 of the outer packaging element 15, wherein its top side is covered by the fifth tab 5.5 and the sixth tab 5.6. The second base plate 3.2, the fifth tab 5.5 and the sixth tab 5.6 form a protrusion beyond the inner packaging element 2 in the second direction R.2, forming a crumple zone K. The stiffenings 21.1, 21.2 of the outer packaging element 15, formed as a double layer, also extend over this crumple zone K in the second direction R.2, so that a particularly stable crumple zone K is achieved.

FIG. 6 shows a fixing means 32 which is provided as an element formed separately from the folding packaging 1.1. Such a fixing means 32 corresponds to the fixing means 25 according to FIG. 4 and, with the same effect and for the same purpose, can be inserted in a folding packaging 1.1 which has no fixing means 25, in order to form a folding packaging system. The fixing means 32 may also, if required, be glued into a folding packaging 1.1, in particular by means of a fastening means (not shown) such as an adhesive strip, preferably on the first base plate 3.1.

FIG. 7 shows an insert base 33 which can be inserted in a folding packaging 1.1, 1.2 above and/or below the vinyl record(s) 29 in order to achieve a stiffening and protect the vinyl record(s) 29 in particular against buckling or bending. The insert base 33 is preferably formed from a stable cardboard and has an inner region 34 which can be separated from the insert base 33 along a perforation 35. When the inner region 34 is removed, the insert base 33 forms a receiver for a vinyl record of smaller format than the format for which the folding packaging 1.1, 1.2 was originally provided. The insert base 33 may then be laid around such a small vinyl record as a frame. For example, in this way a 7-inch vinyl record can be transported in the folding packaging 1.1, 1.2, the dimensions of which were actually designed for a 12-inch vinyl record. The inner region 34 may also be dimensioned such that a CD with its plastic sleeve can be inserted there, so that the folding packaging 1.1, 1.2 may also be used to transport CDs, or vinyl records 29 and CDs can be transported at the same time.

LIST OF REFERENCE SIGNS

1.1 Folding packaging
1.2 Folding packaging
2 Inner packaging element
3.1 First base plate
3.2 Second base plate
4.1 First edge of first base plate
4.2 Second edge of first base plate
4.3 Third edge of first base plate
4.4 Fourth edge of first base plate
5.1 First tab
5.2 Second tab
5.3 Third tab
5.4 Fourth tab
5.5 Fifth tab
5.6 Sixth tab
6 Multiple fold
7 Double fold
8 Side face
9 Fastening means
10 Portion
11 Tear strip
12 Fastening means
15 Outer packaging element
16.1 First edge of second base plate
16.2 Second edge of second base plate
16.3 Third edge of second base plate
16.4 Fourth edge of second base plate
17 Fastening means
18 Portion
19 Tear strip
20 Fastening means
21.1 First stiffening
21.2 Second stiffening
25 Fixing means
28 Enclosed space of inner packaging element
29 Vinyl record(s)
30 Enclosed space of outer packaging element
32 Fixing means
33 Insert base
34 Inner region of insert base
35 Perforation
K Crumple zone
R.1 First direction
R.2 Second direction While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the attached drawings and claims.

What is claimed is:

1. Folding packaging (1.1, 1.2) for transporting vinyl records (29), comprising an inner packaging element (2) and an outer packaging element (15);
    wherein the inner packaging element (2) comprises:
        a rectangular first base plate (3.1);
        a first tab (5.1) connected to a first edge (4.1) of the first base plate (3.1);
        a second tab (5.2) connected to a second edge (4.2) of the first base plate (3.1) opposite the first edge (4.1) of the first base plate (3.1);
        a third tab (5.3) connected to a third edge (4.3) of the first base plate (3.1); and
        a fourth tab (5.4) connected to a fourth edge (4.4) of the first base plate (3.1) opposite the third edge (4.3) of the first base plate (3.1);
    wherein the outer packaging element (15) comprises;
        a rectangular second base plate (3.2);
        a fifth tab (5.5) connected to a first edge (16.1) of the second base plate (3.2); and
        a sixth tab (5.6) connected to a second edge (16.2) of the second base plate (3.2) opposite the first edge (16.1) of the second base plate (3.2);

wherein the first base plate (3.1) and the second base plate (3.2) lie flat on one another and are connected together;

wherein the tabs (5.1, 5.2, 5.3, 5.4, 5.5, 5.6) form folds with the associated base plates (3.1, 3.2) and can be folded onto the base plates (3.1, 3.2) to enclose the vinyl record(s) (29);

wherein the outer packaging element (15) in the closed state is provided to surround the closed inner packaging element (2);

wherein the first base plate (3.1) is glued to the second base plate (3.2);

wherein the folding packaging comprises at least one fixing means (25,32) inserted in the inner packaging element (2) for fixing a vinyl record (29) or multiple vinyl records (29); and wherein the fixing means (25,32) is provided to extend over the first base plate (3.1), the first tab (5.1) and the second tab (5.2) and surround the vinyl record (29) or records (29).

2. The folding packaging (1.1, 1.2) according to claim 1, wherein a fixing means (25) for fixing a vinyl record (29) or multiple vinyl records (29) is attached, in particular glued, in the inner packaging element (2).

3. The folding packaging (1.1, 1.2) according to claim 2, wherein the fixing means (25) is configured as a structured cardboard, in particular corrugated cardboard, or as bubble wrap.

4. The folding packaging (1.1, 1.2) according to claim 2, wherein the fixing means (25) is attached to the first base plate (3.1).

5. The folding packaging (1.1, 1.2) according to claim 1, wherein at least two mutually opposite tabs (5.1, 5.2, 5.3, 5.4, 5.5, 5.6), in particular at least the fifth tab (5.5) and the sixth tab (5.6), form double folds (7) with the associated base plates (3.1, 3.2); and wherein a side face (8) of the assigned packaging element (2, 15) is formed between two parallel fold edges of the double fold (7).

6. The folding packaging (1.1, 1.2) according to claim 1, wherein the inner packaging element (2) and/or the outer packaging element (15) are made of cardboard.

7. The folding packaging (1.1, 1.2) according to claim 1, wherein the first tab (5.1) and the second tab (5.2) are configured as inner tabs (5.1, 5.2, 5.3, 5.4) relative to the third tab (5.3) and the fourth tab (5.4).

8. The folding packaging (1.1, 1.2) according to claim 1, wherein the first tab (5.1) and the second tab (5.2) lie opposite one another in a first direction (R.1), and wherein the fifth tab (5.5) and the sixth tab (5.6) also lie opposite one another in the first direction (R.1).

9. The folding packaging (1.1, 1.2) according to claim 8, wherein the second base plate (3.2) protrudes beyond the first base plate (3.1) on both sides in the first direction (R.1) and/or in a second direction (R.2) running perpendicular to the first direction (R.1).

10. The folding packaging (1.1, 1.2) according to claim 9, wherein the second base plate (3.2), the fifth tab (5.5) and/or the sixth tab (5.6) each have stiffenings (21.1, 21.2) at their mutually opposite edges (16.3, 16.4) in the second direction (R.2).

11. The folding packaging (1.1, 1.2) according to claim 1, wherein at least the first tab (5.1) and the second tab (5.2) each have a multiple fold (6) with multiple mutually parallel fold edges for optional forming of side faces of different heights of the inner packaging element (2).

12. The folding packaging (1.1, 1.2) according to claim 1, wherein the second tab (5.2), the fourth tab (5.4) and/or the sixth tab (5.6) each have a fastening means (9, 17) for closing the inner packaging element (2) or the outer packaging element (15), wherein the fastening means (9, 17) is formed to be separable, in particular by means of a respective tear strip (10, 18), from the second tab (5.2), the fourth tab (5.4) or the sixth tab (5.6).

13. The folding packaging (1.1, 1.2) according to claim 1, further comprising at least one insert base (33) for supporting or covering one or more vinyl records (29) inserted in the inner packaging element (2).

\* \* \* \* \*